No. 679,076. Patented July 23, 1901.
L. J. JOHNSTON.
EXPANSIBLE PULLEY.
(Application filed July 2, 1900.)
(No Model.)
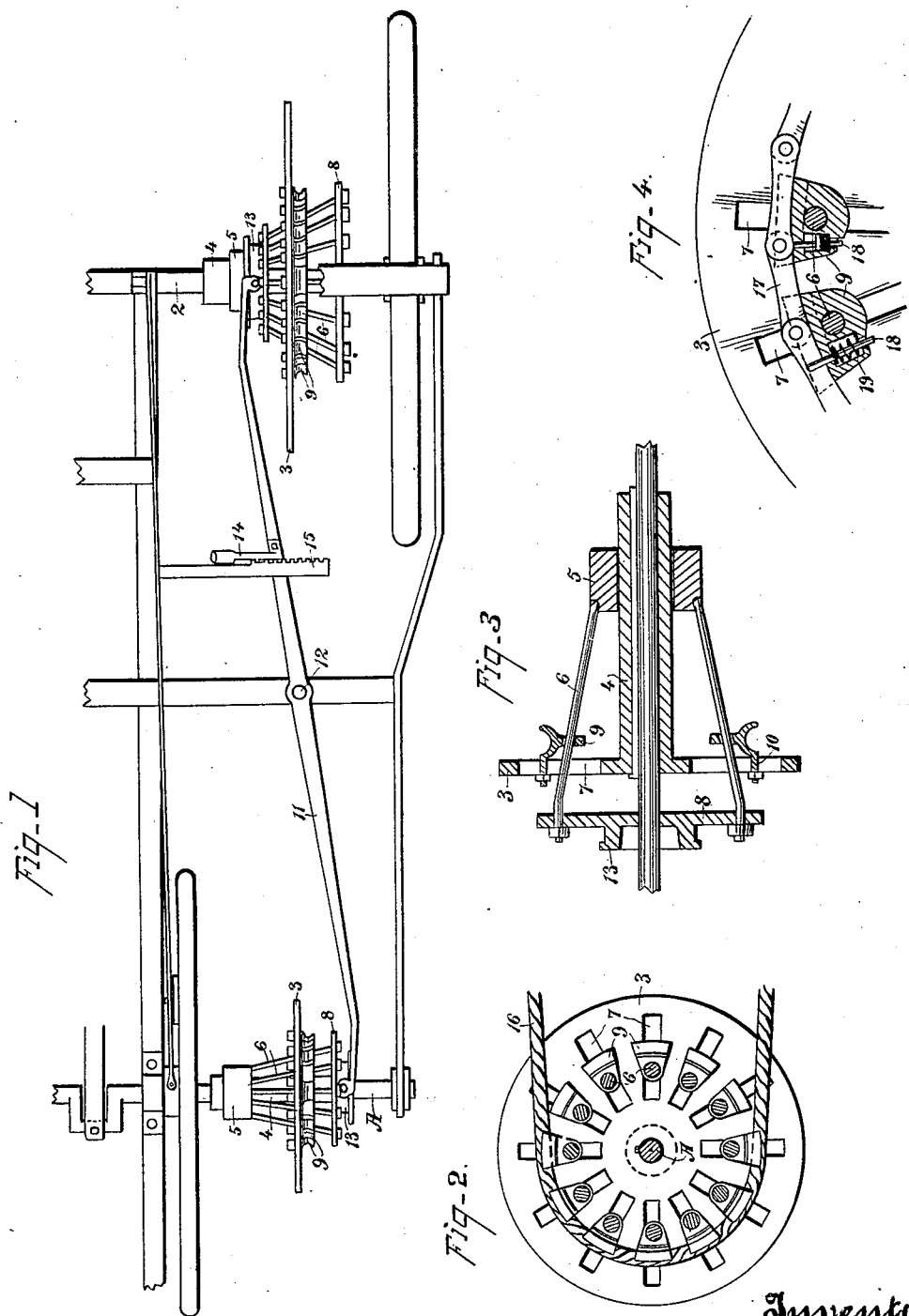
Witnesses,
Inventor,

United States Patent Office.

LEUNE J. JOHNSTON, OF PETALUMA, CALIFORNIA.

EXPANSIBLE PULLEY.

SPECIFICATION forming part of Letters Patent No. 679,076, dated July 23, 1901.

Application filed July 2, 1900. Serial No. 22,298. (No model.)

*To all whom it may concern:*

Be it known that I, LEUNE J. JOHNSTON, a citizen of the United States, residing at Petaluma, county of Sonoma, State of California, have invented an Improvement in Expansible Pulleys; and I hereby declare the following to be a full, clear, and exact description of the same.

My invention relates to improvements in power-transmission devices wherein the driving-pulley may be expanded or contracted and the driven pulley reciprocally contracted or expanded, and of details more fully to be hereinafter set forth.

Having reference to the accompanying drawings, Figure 1 is a plan view showing the general arrangement of my device. Fig. 2 is a vertical section through the rods. Fig. 3 is a longitudinal section of the same. Fig. 4 shows the arrangement when chains are used.

The object of my invention is to furnish a variable-speed mechanism for use particularly in motor-carriages or engine-motors. To this end I provide the power-shaft A and the second shaft 2, upon each of which are the expansible pulleys, which are counterparts of each other.

These pulleys are constructed as follows: 3 represents radially-slotted disks, one of which is fixed upon each of the shafts A and 2 and having a sufficiently-elongated hub 4. Exterior to this hub is a sleeve 5, which turns loosely about the hub and is also slidable longitudinally with relation thereto.

6 represents a series of rods connected with and diverging from the sleeves 5 in cone form and passing through the slots 7 of the disk 3, and the outer ends are connected with the disks 8, as shown plainly in section, Fig. 3. The rods each carry a segment 9 of a sprocket-wheel which is composed of these separated segments. The distance between these segments is sufficient to allow them to be moved inwardly to provide the smallest diameter intended for the pulley, and they are correspondingly moved outward to make the largest diameter. These segments 9 have arms 10 extending through the slots 7 of the disk 3 and practically forming guides which are movable in the slots to hold the segments in place as they are expanded or contracted and while in use.

The expansion or contraction of either of these pulleys is effected by sliding the sleeve 5 and the disk 8 to or from the disk 3, and as these rods 6 are slidable through the segments 9, which are retained in position with relation to the disks 3 by the arm-guides 10, it will be seen that these segments will be correspondingly moved to or from the center about which they revolve. In order to change the sizes of these driving-sprockets in unison, so that as one expands the other would be contracted, I have shown a clutch-lever 11, centrally pivoted to some fixed point, as at 12, and the ends of this lever are adapted to engage with the grooved clutch-rings 13 upon each of the disks 8. A suitable lever, as at 14, serves to move the clutch-lever 11, and the levers 14 and 11 may be held at any desired point of adjustment by means of a toothed rack, as at 15. The flexible rope 16, which passes around the two pulleys thus formed, serves to transmit motion from one to the other. If it be desired to use a chain in place of the rope, it will be necessary to provide for varying positions of the chain with relation to the sprocket-segments 9. The chain may be formed of alternate single and double links connected together by pins, as at 17, Fig. 4, and these links are adapted to engage with some of the radially-slidable pins 18, which are slidable in guides in the segments 9 and are normally pressed outward by springs 19. These springs yield whenever either of the pins 17 of the links are brought in line with the pins 18, and this, it will be manifest, will be liable to occur with changes in the diameter of the sprockets which would either shorten or lengthen the distance between the sprocket-segments, while the length of the chain-links remains the same. Subject to these changes the pulley is substantially of the same construction as that shown and described relatively to Fig. 3. A sufficient number of the pins 18 will, however, be projected at all times to engage with the chain and insure proper transmission of power.

Having thus described my invention, what I claim as new, and desire to secure by Letters Patent, is—

1. In combination with a shaft, a pulley thereon and comprising a radially-slotted disk, sprocket-segments having guide-arms slidable within the slots, a sleeve connected with the sprocket, a disk on the shaft, and a series of rods arranged in cone form having their ends secured to the sleeve and last-named disk and their intermediate portions extending through the segments and slots of the first-named disk.

2. In combination with a shaft, a pulley comprising a radially-slotted disk fixed to the shaft, sprocket-segments slidable in said slots, pins in said segments adapted to engage the links of a sprocket-chain, and means for expanding or contracting the sprocket.

3. In combination with a shaft, a pulley comprising a radially-slotted disk fixed to the shaft, sprocket-segments slidable in said slots, spring-pressed pins carried upon the segments and adapted to engage the links of a sprocket-chain, and means whereby the sprocket is expanded or contracted.

4. The combination with a driving and a driven shaft, of radially-slotted disks fixed to each of said shafts, sprocket-segments guided and slidable to and from the center in the slots, sleeves slidable upon the hubs of the disks, rods connected with said sleeves and diverging outwardly in conical form and passing loosely through the sprocket-segments, and through the slots in the disk which carries them, a second disk with which the outer ends of said rods are connected, and a centrally-fulcrumed clutch-lever, one end of which engages the clutch upon the movable disk of each of the shafts, and means for moving the clutch-lever so that the sprockets upon one shaft are expanded, and those upon the other are correspondingly and simultaneously contracted whereby the rate of motion transmitted from one shaft to the other is varied.

In witness whereof I have hereunto set my hand.

LEUNE J. JOHNSTON.

Witnesses:
S. H. NOURSE,
JESSIE C. BRODIE.